(No Model.)
A. C. VAUGHAN.
NUT LOCK.
No. 516,285. Patented Mar. 13, 1894.
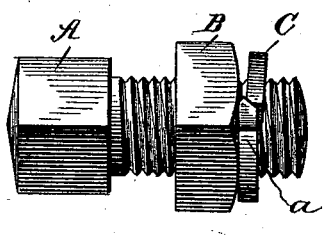
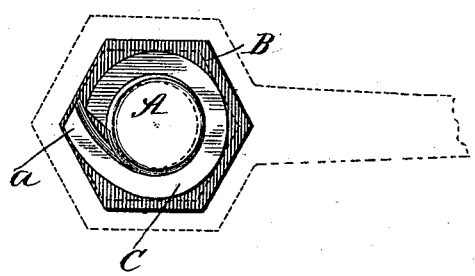
WITNESSES:
Fred G. Dieterich
Edw. W. Byrn.
INVENTOR:
A. C. Vaughan.
BY
ATTORNEYS
THE NATIONAL LITHOGRAPHING COMPANY,
WASHINGTON, D. C.

UNITED STATES PATENT OFFICE.

AARON C. VAUGHAN, OF ROCKFORD, OHIO.

NUT-LOCK.

SPECIFICATION forming part of Letters Patent No. 516,285, dated March 13, 1894.

Application filed May 15, 1891. Serial No. 392,822. (No model.)

*To all whom it may concern:*

Be it known that I, AARON C. VAUGHAN, of Rockford, in the county of Mercer and State of Ohio, have invented a certain new and useful Improvement in Nut-Locks, of which the following is a specification.

My invention relates to that form of nut locks in which a divided spring ring is threaded on its inner side and applied to the threaded bolt in front of the nut, and it consists in the special construction of such divided spring ring whereby it may be turned to place by means of a wrench as hereinafter fully described.

Figure 1 is a side view of the nut lock applied to a bolt. Fig. 2 is an end view. Fig. 2ª is a diagram illustrating the relation of the nut lock to the circle of the bolt.

A represents a bolt; B the nut, and C the spring ring. This is made of metal of substantially uniform transverse dimension, whose inner periphery is sharpened or made V-shaped to adapt it to enter the V-shaped thread of the bolt. This inner periphery is also adjusted to a spiral pitch, but a pitch either less than that of the threads on the bolt, or somewhat greater than the same. The object of this is to cause the spring ring to bind with a lateral friction when being turned on the bolt, which friction is of such considerable amount as to prevent the nut from turning off, and necessitates the employment of a wrench for applying the divided ring after the nut has been turned up to place. For this purpose the outer periphery of the ring is not preserved within the bounds of a true circle, but is extended out to form an angular projection at, $a$, by extending one end of the divided ring past the other end, as in Fig. 2.

The inner end $b$ of the ring does not terminate in the curve of the circle of the bolt when not applied, but curls inwardly from such circle with a volute spiral as shown diagrammatically in Fig. 2ª. This causes the inner end $b$ to expand slightly upon the threaded bolt when applied, and to pinch and hold thereagainst with a contractile effect that prevents it from turning off. When the wrench is applied to the nut lock, as shown in dotted lines, the point, $a$, affords a bearing for the wrench that compels the divided ring to turn and enables me to overcome the lateral spring strain of the divided ring in screwing it up to place.

I am aware that various patents have been granted for divided spring rings designed to be used as nut locks, and I make no claim to this broadly.

Having thus described my invention, what I claim is—

1. A nut lock consisting of a divided spring ring having its ends permanently arranged in different planes and having one end extended past the other and projecting beyond the circle of the bolt to give a bearing for the wrench substantially as shown and described.

2. A nut lock consisting of a divided spring ring having one of its ends extended past the other and projecting beyond the circle of the bolt to give a bearing for the wrench, and having its other end bent or curled inwardly from the circle of the bolt substantially as shown and described.

AARON C. VAUGHAN.

Witnesses:
EDWD. W. BYRN,
P. B. TURPIN.